US012639138B1

(12) United States Patent

Greenspan et al.

(10) Patent No.: US 12,639,138 B1
(45) Date of Patent: May 26, 2026

(54) METHOD AND SYSTEM FOR AGGREGATING EVENT OCCURRENCE INDICATIONS

(71) Applicant: NEXT SILICON LTD., Givatayim (IL)

(72) Inventors: Daniel Greenspan, Jerusalem (IL); Yoav Lossin, Givat-Ada (IL); Ronen Gal, Ramat Gan (IL); Oded Margalit, Ramat Gan (IL)

(73) Assignee: NEXT SILICON LTD., Givatayim (IL)

( * ) Notice: Subject to any disclaimer, the term of this patent is extended or adjusted under 35 U.S.C. 154(b) by 0 days.

(21) Appl. No.: 19/289,186

(22) Filed: Aug. 4, 2025

(51) Int. Cl.
*G06F 9/54* (2006.01)
*G06N 7/01* (2023.01)

(52) U.S. Cl.
CPC .............. *G06F 9/542* (2013.01); *G06N 7/01* (2023.01)

(58) Field of Classification Search
CPC .................................. G06F 9/542; G06N 7/01
See application file for complete search history.

(56) References Cited

U.S. PATENT DOCUMENTS 10,091,297 B1 * 10/2018 Zhao ..................... G06F 16/214
2010/0198776 A1 * 8/2010 Wang ..................... G06Q 10/00
706/58

| | | | |
|---|---|---|---|
| 2013/0063460 A1 * | 3/2013 | Marison | G06T 11/206 |
| | | | 345/589 |
| 2013/0250808 A1 * | 9/2013 | Hui | H04W 40/023 |
| | | | 370/255 |
| 2024/0403138 A1 * | 12/2024 | Sabhanatarajan | G06F 9/541 |
| 2025/0231798 A1 * | 7/2025 | Zhao | G06F 9/5038 |

* cited by examiner

*Primary Examiner* — Jorge A Chu Joy-Davila

(74) *Attorney, Agent, or Firm* — The Roy Gross Law Firm, LLC; Roy D. Gross

(57) ABSTRACT

An event aggregation fabric, implemented over an Integrated Circuit (IC) may include a Directed Acyclic Graph (DAG), including one or more aggregation nodes. Each aggregation node may receive input cue signals, originating from one or more source modules in the IC via respective one or more lean (e.g., single-wire) connections, indicate occurrence of events in respective source modules. The aggregation node may maintain a deficit count of the input cue signals, and generate an output cue signal, based on the deficit count. When the aggregation node is a terminal node of the DAG, it may transfer the output cue signal as an aggregated indication, representing occurrence of events in the source modules, to a target module in the IC. Otherwise, the aggregation node may transfer the output cue signal via lean connection to a subsequent aggregation node of the DAG, towards the terminal node.

18 Claims, 8 Drawing Sheets

| Condition# | Inputs | | Outputs | |
|---|---|---|---|---|
| | Total Active Ack Inputs | DC | Ack Output Value | New DC value |
| A | 0 | 0 | 0 | 0 |
| B | 1 | Any value | 1 | DC (unchanged) |
| C | 2 | Any value | 1 | DC+1 |
| D | 3 | Any value | 1 | DC+2 |
| E | 4 | Any value | 1 | DC+3 |
| F | N (e.g., 5) | Any value | 1 | DC + (N-1) (e.g., DC+4) |
| G | 0 | >0 | 1 | DC-1 |

FIG. 4

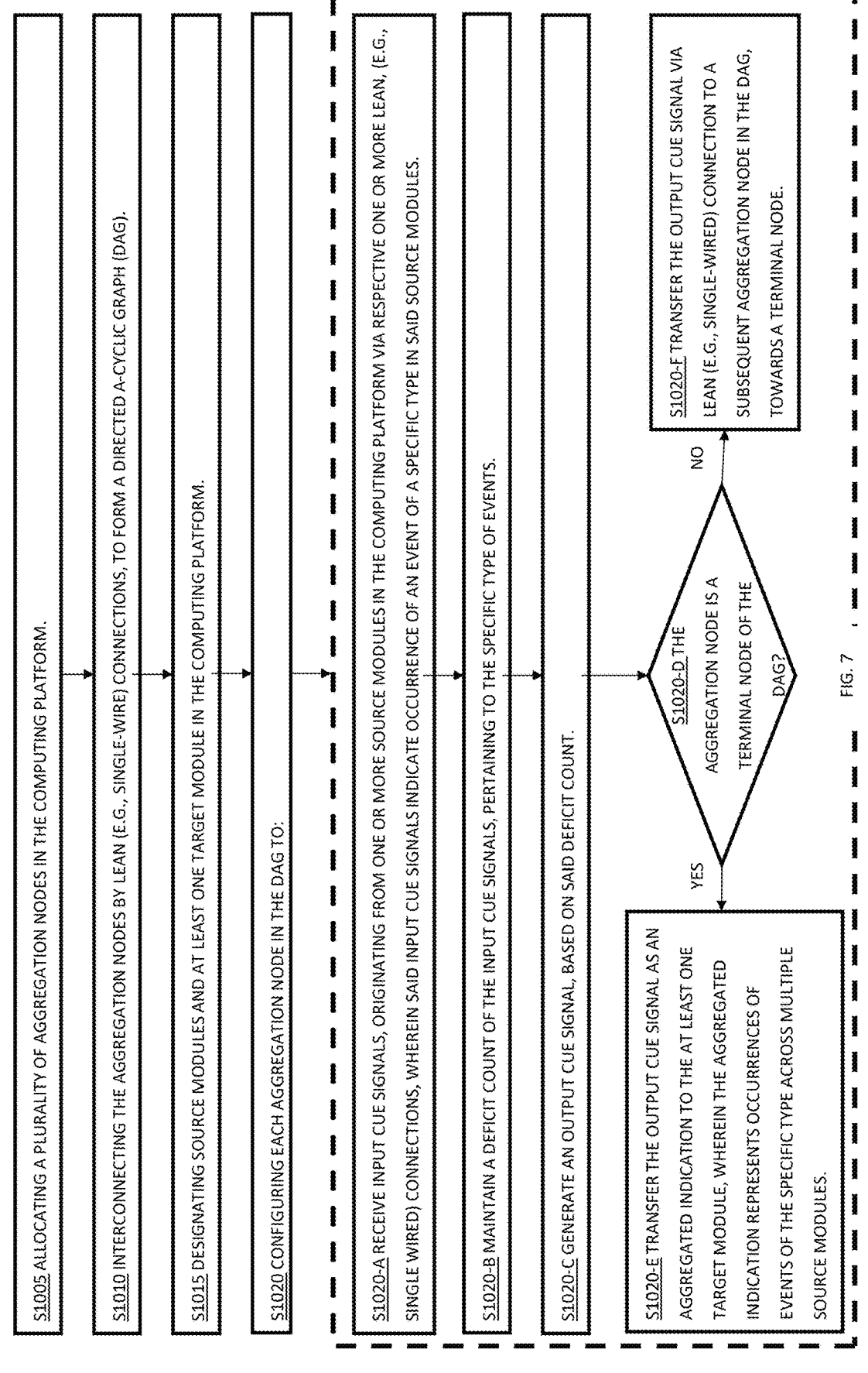

S1005 ALLOCATING A PLURALITY OF AGGREGATION NODES IN THE COMPUTING PLATFORM.

S1010 INTERCONNECTING THE AGGREGATION NODES BY LEAN (E.G., SINGLE-WIRE) CONNECTIONS, TO FORM A DIRECTED A-CYCLIC GRAPH (DAG).

S1015 DESIGNATING SOURCE MODULES AND AT LEAST ONE TARGET MODULE IN THE COMPUTING PLATFORM.

S1020 CONFIGURING EACH AGGREGATION NODE IN THE DAG TO:

S1020-A RECEIVE INPUT CUE SIGNALS, ORIGINATING FROM ONE OR MORE SOURCE MODULES IN THE COMPUTING PLATFORM VIA RESPECTIVE ONE OR MORE LEAN, (E.G., SINGLE WIRED) CONNECTIONS, WHEREIN SAID INPUT CUE SIGNALS INDICATE OCCURRENCE OF AN EVENT OF A SPECIFIC TYPE IN SAID SOURCE MODULES.

S1020-B MAINTAIN A DEFICIT COUNT OF THE INPUT CUE SIGNALS, PERTAINING TO THE SPECIFIC TYPE OF EVENTS.

S1020-C GENERATE AN OUTPUT CUE SIGNAL, BASED ON SAID DEFICIT COUNT.

S1020-E TRANSFER THE OUTPUT CUE SIGNAL AS AN AGGREGATED INDICATION TO THE AT LEAST ONE TARGET MODULE, WHEREIN THE AGGREGATED INDICATION REPRESENTS OCCURRENCES OF EVENTS OF THE SPECIFIC TYPE ACROSS MULTIPLE SOURCE MODULES.

S1020-D THE AGGREGATION NODE IS A TERMINAL NODE OF THE DAG?

YES

NO

S1020-F TRANSFER THE OUTPUT CUE SIGNAL VIA LEAN (E.G., SINGLE-WIRED) CONNECTION TO A SUBSEQUENT AGGREGATION NODE IN THE DAG, TOWARDS A TERMINAL NODE.

FIG. 7

METHOD AND SYSTEM FOR AGGREGATING EVENT OCCURRENCE INDICATIONS

FIELD OF INVENTION

The present invention relates reconfigurable computing devices, and more particularly to a system and method of reconfigurable aggregation of event occurrence indications.

BACKGROUND

In modern integrated circuits (ICs), such as system-on-chip (SoC) designs, complex tasks are often distributed across multiple processing elements. These processing elements may include various types of computational units, memory structures, and specialized hardware accelerators. As the complexity of ICs increases, efficient communication and synchronization between these distributed components become increasingly challenging.

In the context of this invention, control of a processing workflow may refer to the management and coordination of distributed computational tasks across multiple processing elements (e.g., within a reconfigurable IC). This control may involve, for example, task distribution, resource allocation, and synchronization of various hardware and/or software-based processing stages.

One common requirement in distributed processing systems is the need to aggregate and count signals such as acknowledgments, or similar events from multiple sources. This aggregation process is useful for various purposes, including for example, task completion tracking, resource management, and system-wide synchronization.

Traditional approaches to event aggregation often involve dedicated wiring for each source or complex messaging protocols that can introduce latency, increase complexity, and consume significant chip area.

The design of on-chip communication networks, often referred to as network-on-chip (NoC) architectures, plays a role in facilitating efficient data transfer and synchronization between different components of an IC. These networks typically handle regular data routing tasks but may not be optimized for specialized functions such as distributed event aggregation.

For example, in many IC designs, broadcast functionality and acknowledgment mechanisms are secondary considerations compared to primary data routing functions. This can lead to suboptimal solutions for scenarios where acknowledgments or event notifications need to be collected from numerous sources across the chip. Software-based polling methods are sometimes employed to address these scenarios, but these can introduce additional overhead and latency.

As IC designs continue to evolve, there is an ongoing need for efficient hardware mechanisms that can handle the aggregation of distributed events or acknowledgments. Such mechanisms ideally would minimize wiring complexity, reduce latency, and provide flexibility to accommodate various system configurations and use cases.

SUMMARY

The present invention relates to an event aggregation fabric that may be implemented in reconfigurable Integrated Circuits (ICs). The fabric may include, or be configured as a Directed Acyclic Graph (DAG) of interconnected aggregation nodes, each capable of receiving, processing, and forwarding event signals via lean connections (e.g., single wire connections) to subsequent nodes. The interconnected aggregation nodes may perform deficit counting, allowing them to accurately track the difference between incoming and outgoing event signals. This combination of a flexible DAG structure and sophisticated event tracking mechanism may facilitate efficient event management in complex environments such as reconfigurable IC platforms.

As explained herein, the event aggregation fabric of the present invention may provide several advantages over currently available solutions for event aggregation, as part of controlling a processing workflow, e.g., in the context of reconfigurable ICs.

For example, the event aggregation fabric of the present invention may be dynamically reconfigured to match varying task allocation patterns across Processing Elements (PEs) of the IC, offering adaptability to changing computational demands. A tight integration between task distribution, IC reconfiguration and event aggregation may enable optimized performance in reconfigurable ICs: As tasks are identified and allocated to PEs, the aggregation fabric may be concurrently reconfigured to establish efficient aggregation paths, thereby minimizing communication overhead and maximizing system responsiveness and throughout.

The use of lean connections between aggregation nodes may significantly reduce wiring complexity and chip area utilization compared to traditional dedicated wiring schemes or complex messaging protocols. The term "lean" in this context may refer to the use of minimal, efficient communication pathways between aggregation nodes. For example, wired connections (e.g., single-wired connections), plastic optical-fiber connection, and the like may be employed to transmit event signals between nodes, to significantly reduce the complexity and resource requirements of the interconnect structure. These lean connections may allow direct, point-to-point signal transmission without the need for complex routing protocols or additional supporting circuitry. This efficient communication infrastructure may enable the fabric to scale effectively with increasing numbers of logical units in the IC, potentially accommodating large-scale reconfigurable IC designs without proportional increases in overhead.

The hardware-based nature of the event aggregation fabric may offer lower latency in collecting and propagating indications of event occurrence such as task completion indications and message acknowledgments, compared to software-based polling methods.

This reduced latency may be particularly beneficial in reconfigurable ICs, where rapid adaptation to changing workloads and task distributions plays a significant role in maintaining optimal performance.

As explained herein, the event aggregation fabric of the present invention may handle multiple event types simultaneously, thus providing flexibility in managing diverse task completion scenarios. For example, aggregation nodes may maintain separate deficit counts for different event types, allowing the event aggregation fabric to accurately track and report various categories or scenarios of task completions across the system (e.g., reconfigurable IC).

The implementation of deficit counting within aggregation nodes may enable the fabric to efficiently handle bursts of events without data loss, even when the output rate of an aggregation node is temporarily lower than its input rate. This may be beneficial, for example on platforms of distributed computing, such as reconfigurable ICs, where task completion rates may vary significantly based on dynamic resource allocation and workload characteristics.

Embodiments of the invention may include an event aggregation fabric, configured as a Directed A-cyclic Graph (DAG). The event aggregation fabric may include one or more aggregation nodes, each configured to receive input cue signals, originating from one or more source modules via respective one or more lean connections. The input cue signals may indicate occurrence of an event in the source modules, such as completion of a task, acknowledgement of data reception, and the like. One or more (e.g., each) aggregation node may maintain a deficit count of the input cue signals, and may generate an output cue signal, based on the deficit count (e.g., a value of a counter pertaining to that aggregation node).

When the aggregation node is not configured as a terminal node of the DAG, it may be configured to transfer the output cue signal via a lean connection to a subsequent aggregation node of the DAG, towards the terminal node. Conversely, when the aggregation node is configured as a terminal node of the DAG, it may be configured to transfer the output cue signal as a global indication signal, representing an aggregation of occurrence of events in said source modules, to a target module. As explained herein, the target module may be configured to control a processing workflow, e.g., as threads of software and/or dataflow in hardware, based on said global indication.

According to some embodiments, the event aggregation fabric may further include a plurality of leaf nodes at a periphery of the DAG. Each leaf node may be configured to receive indication of occurrence of an event from a specific source module. The leaf node may, for example receive this indication actively, (e.g., by polling the respective source module), or passively (e.g., as an interrupting signal from the respective source module). The leaf node may subsequently transmit an input cue signal, indicating occurrence of that event via a lean connection, to a parent aggregation node in the DAG.

Additionally, or alternatively, the DAG may further include one or more relay nodes. At least one (e.g., each) relay node may be configured to receive a relay rule, defining a logic for relaying input cue signals between an input port and an output port of that relay node. The relay node may subsequently receive a cue signal in the input port, as an output of a first aggregation node or leaf node, and transfer the received cue signal via the output port, as input to a second aggregation node or terminal node in the aggregation fabric, based on the relay rule.

According to some embodiments, at least one aggregation node may be configured to increment the deficit count when a number of input cue signals received in a predetermined timeframe exceeds the number of output cue signals generated in that timeframe.

Additionally, or alternatively, the at least one aggregation node may be configured to decrement the deficit count, and generate an output cue signal at a predetermined timeframe, when (i) the deficit count is non-zero and (ii) a number of input cue signals received in that timeframe is less than number of output cue signals generated in that timeframe.

Additionally, or alternatively, the at least one aggregation node may be configured to aggregate indications pertaining to two or more event types. In such embodiments, the at least one aggregation node may (i) maintain a first deficit count of input cue signals, pertaining to a first type of events, (ii) maintain at least one second deficit count of input cue signals, pertaining to at least one respective, second type of events; and (iii) generate the output cue signal, based on the first deficit count and the at least one second deficit count.

The first type of events may, for example, be a termination of a first type of task or subtask in the source modules. The at least one second type of events may be a termination of at least one respective, second type of task or subtask in the source modules.

According to some embodiments, at least one first terminal node of the DAG may be adapted to transfer the output cue signal to a first target module, as a global acknowledgement signal, representing an overall indication of termination of the first type of task in the source modules. Additionally, or alternatively, at least one second terminal node of the DAG may be adapted to transfer respective output cue signals to at least one second, respective target module, as a global acknowledgement signal, representing an aggregated indication of termination of the at least one second type of task in the source modules.

According to some embodiments the aggregation fabric may be configured to employ various types of lean communication protocols, and connection types, that may be globally, or locally determined by respective generation rules.

For example, at least one aggregation node may be configured to receive a generation rule, defining a logic for generating an output cue signal, and receive one or more input cue signals via one or more input ports of the aggregation node. The at least one aggregation node may subsequently be configured to generate the output cue signal on an output port of the aggregation node, based on the deficit count and the one or more input cue signals, in accordance with the generation rule, as elaborated herein.

For example, the generation rule may determine an output format of output cue signals. The output format may include, for example, a broadcast, multicast or unicast of an output cue signal to one or more target modules and/or subsequent aggregation nodes in the DAG, via one, two or more output ports of the aggregation node.

In another example, the generation rule may determine an output format of output cue signals that may be selected from a list consisting of: (i) transmission of output cue signals, pertaining to a first event type, and at least one second event type via separate, dedicated output ports of the aggregation node, and (ii) transmission of an encoded combination of output cue signals pertaining to the first event type and the at least one second event type, via a common (e.g., single) output port of the aggregation node.

Additionally, or alternatively, the logic for generating an output cue signal may include, for example (i) a function of a deficit count pertaining to the first event type, (ii) a function of a deficit count pertaining to the at least one second event type, (iii) a weighted function of input cue signals from preceding aggregation nodes, (iv) a weighted function of input cue signals from leaf nodes, and (v) any combination thereof, as elaborated herein.

In another example, the logic for generating an output cue signal may include, for example, a prioritization scheme, for prioritizing between a first event type and at least one second event type.

This prioritization may be calculated, for example, based (i) a deficit count of the first event type (ii) a deficit count of the at least one second event type, (iii) a metric of fairness between the first event type and the at least one second event type, (iv) time of arrival of input cue signals of the first event type, (v) time of arrival of input cue signals of the at least one second event type, or any combination thereof.

Embodiments of the invention may include a reconfigurable Integrated Circuit (IC). Embodiments of the reconfigurable IC may include a plurality of Processing Elements (PEs); a task distribution module, configured to identify tasks for execution within the IC; and a resource allocation module. The task distribution module and resource allocation module may be implemented as a software module, a hardware module, or any combination thereof. For example, the resource allocation module may include at least one processor configured to allocate subsets of the plurality of PEs as source modules, adapted to perform the identified tasks; allocate at least one PE as a target module in the IC; and based on said allocation, define a Directed A-cyclic Graph (DAG) according to the allocated source modules.

As explained herein, resource allocation module may configure the DAG to aggregate indications of event notification from the source nodes; generate a global notification signal, representing a count of notification events by the source modules of the IC; and propagate the global notification signal to the at least one target module. The at least one target module may, in turn, be adapted to control a processing workflow in the IC based on the global notification signal, as explained herein.

As explained herein, the DAG may include a plurality of aggregation nodes, interconnected over lean connections. One or more aggregation nodes of the plurality of aggregation nodes may be configured to receive input cue signals, originating from one or more source modules in the IC via respective one or more lean connections, wherein said input cue signals indicate completion of a task in said source modules; maintain a deficit count of the input cue signals; and generate an output cue signal, based on the deficit count.

When the aggregation node is not a terminal node of the DAG, it may transfer the output cue signal via a lean connection to a subsequent aggregation node of the DAG, towards the terminal node. When the aggregation node may be a terminal node of the DAG, it may transfer the output cue signal as a global indication signal, representing completion of tasks in said source modules, to a target module in the IC. The target module may, in turn, be configured to control a processing workflow based on said global indication.

Embodiments of the invention may include a method of aggregating indications in an Integrated Circuit (IC) by at least one processor. Embodiments of the method may include allocating a plurality of aggregation nodes in the IC; interconnecting the aggregation nodes by single-wire connections, to form a Directed A-cyclic Graph (DAG); and designating source modules and at least one target module in the IC.

Embodiments of the method may further include configuring each aggregation node in the DAG to: receive input cue signals, originating from one or more source modules in the IC via respective one or more single wire connections, wherein said input cue signals indicate occurrence of an event of a specific type in said source modules; maintain a deficit count of the input cue signals, pertaining to the specific type of events; generate an output cue signal, based on said deficit count. When the aggregation node is not a terminal node of the DAG, it may transfer the output cue signal via single-wire connection to a subsequent aggregation node in the DAG, towards the terminal node. When the aggregation node is a terminal node of the DAG, it may transfer the output cue signal as a global indication signal, representing an aggregation of occurrence of events in said source modules, to a target module in the IC.

BRIEF DESCRIPTION OF FIGURES

The subject matter regarded as the invention is particularly pointed out and distinctly claimed in the concluding

Figure 1:
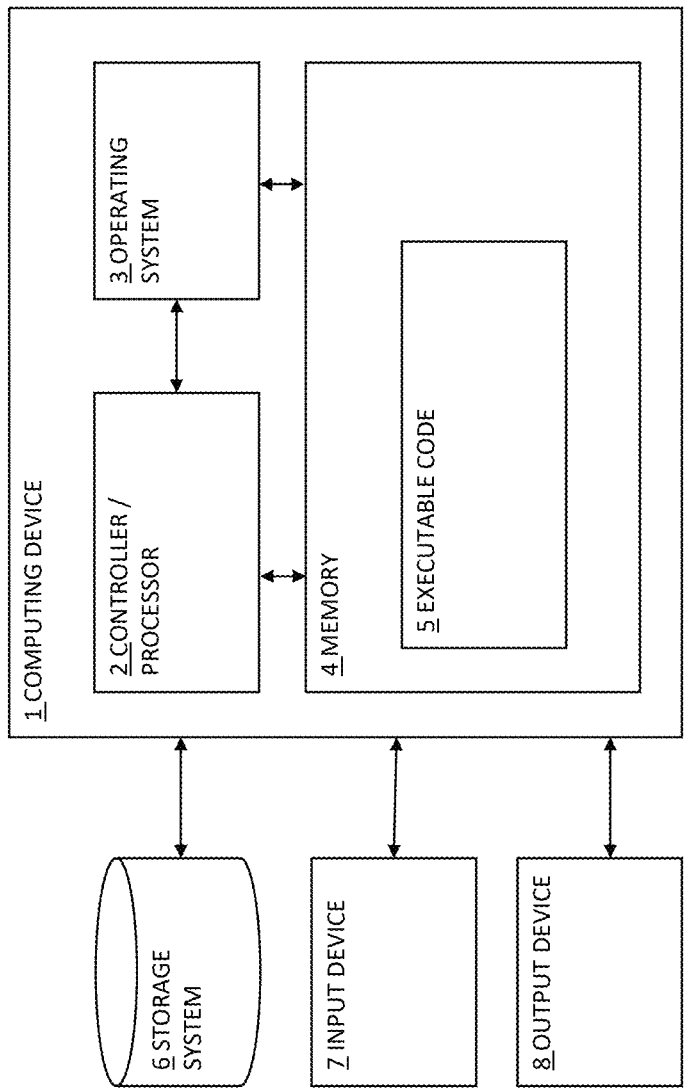
Figure 2:
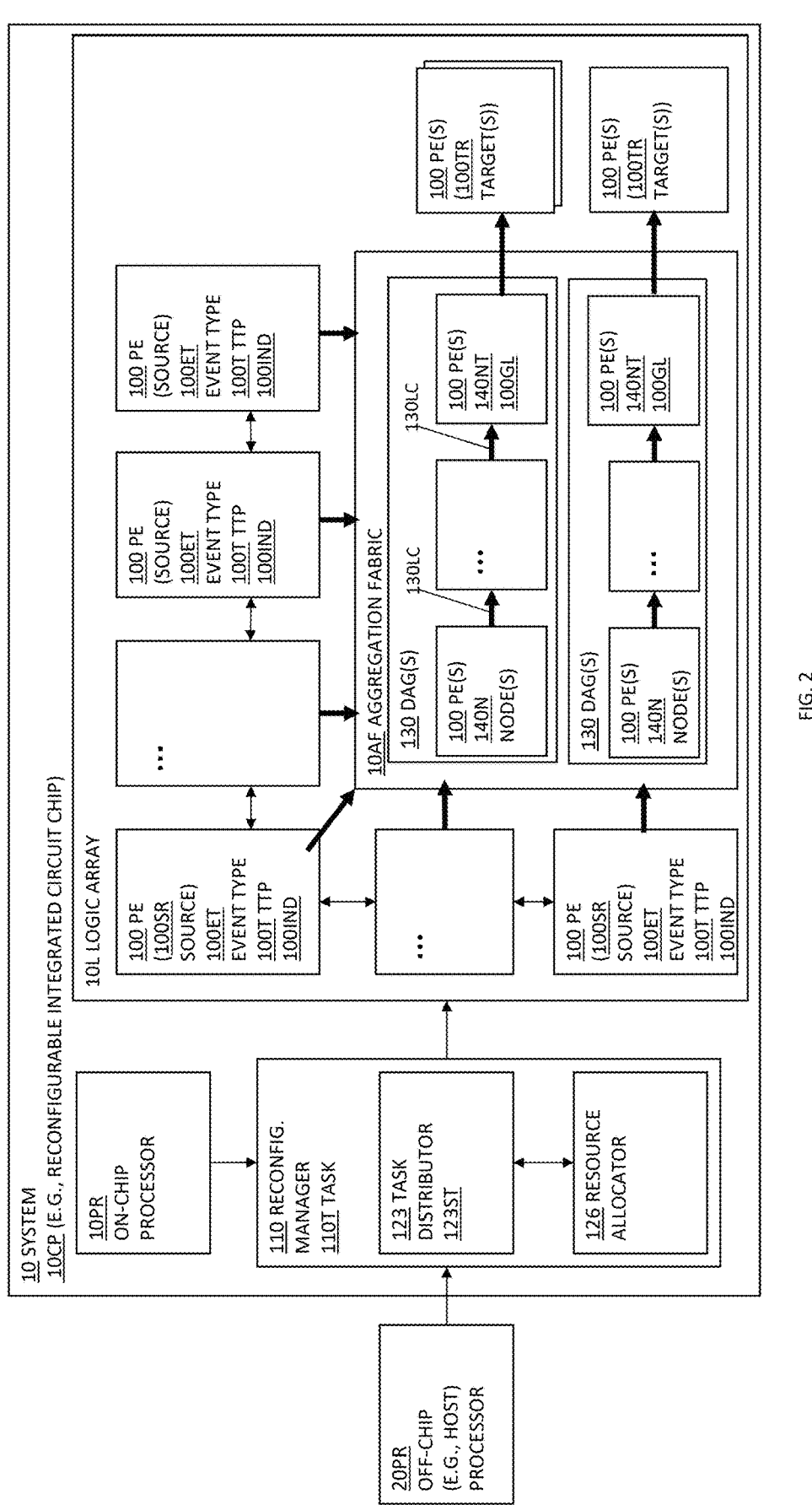
Figure 3A:
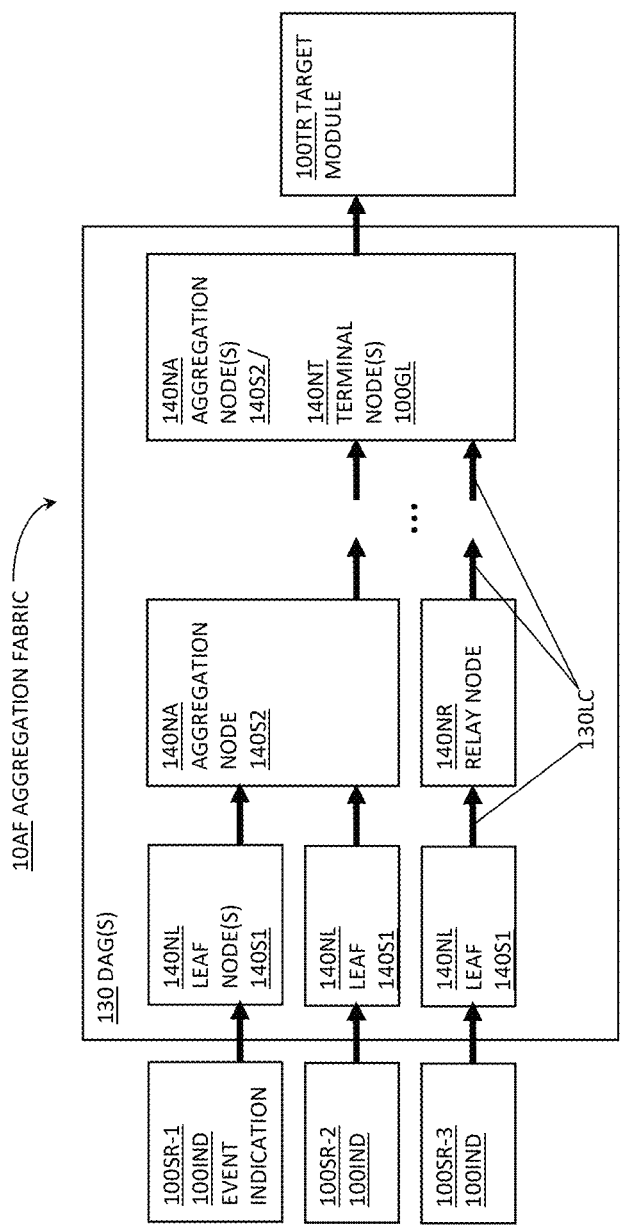
Figure 3B:
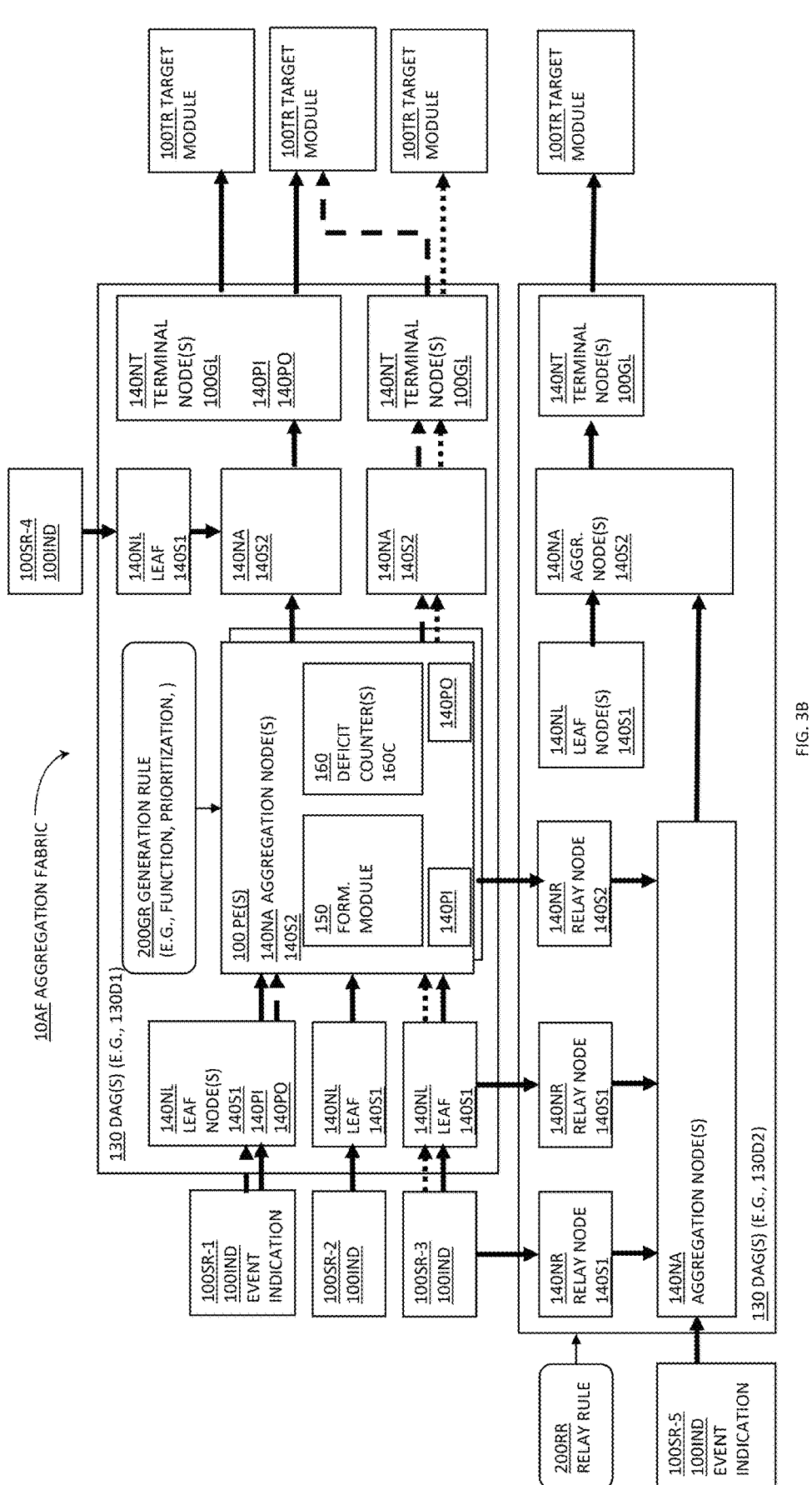
Figure 5:
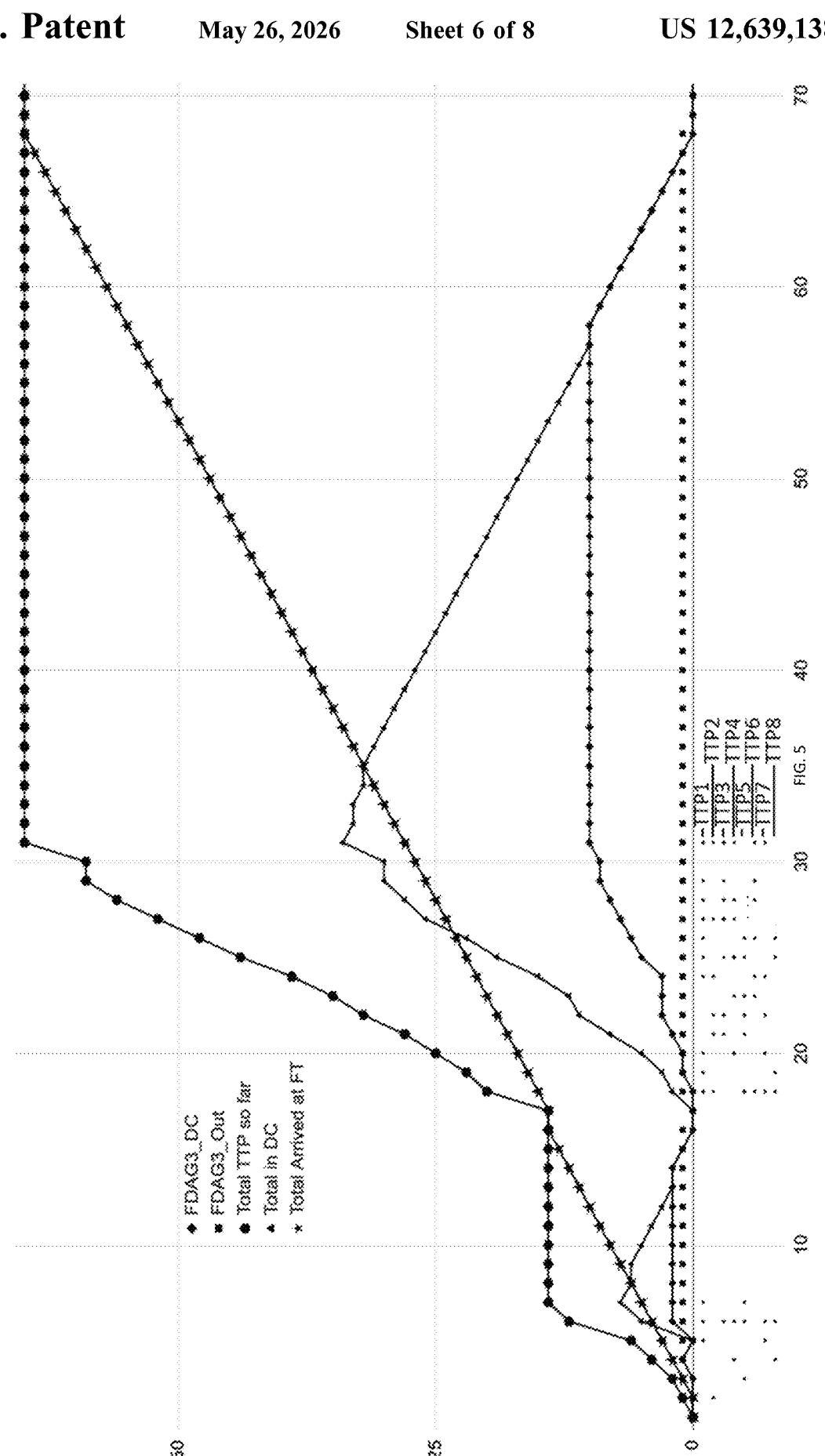
Figure 6:
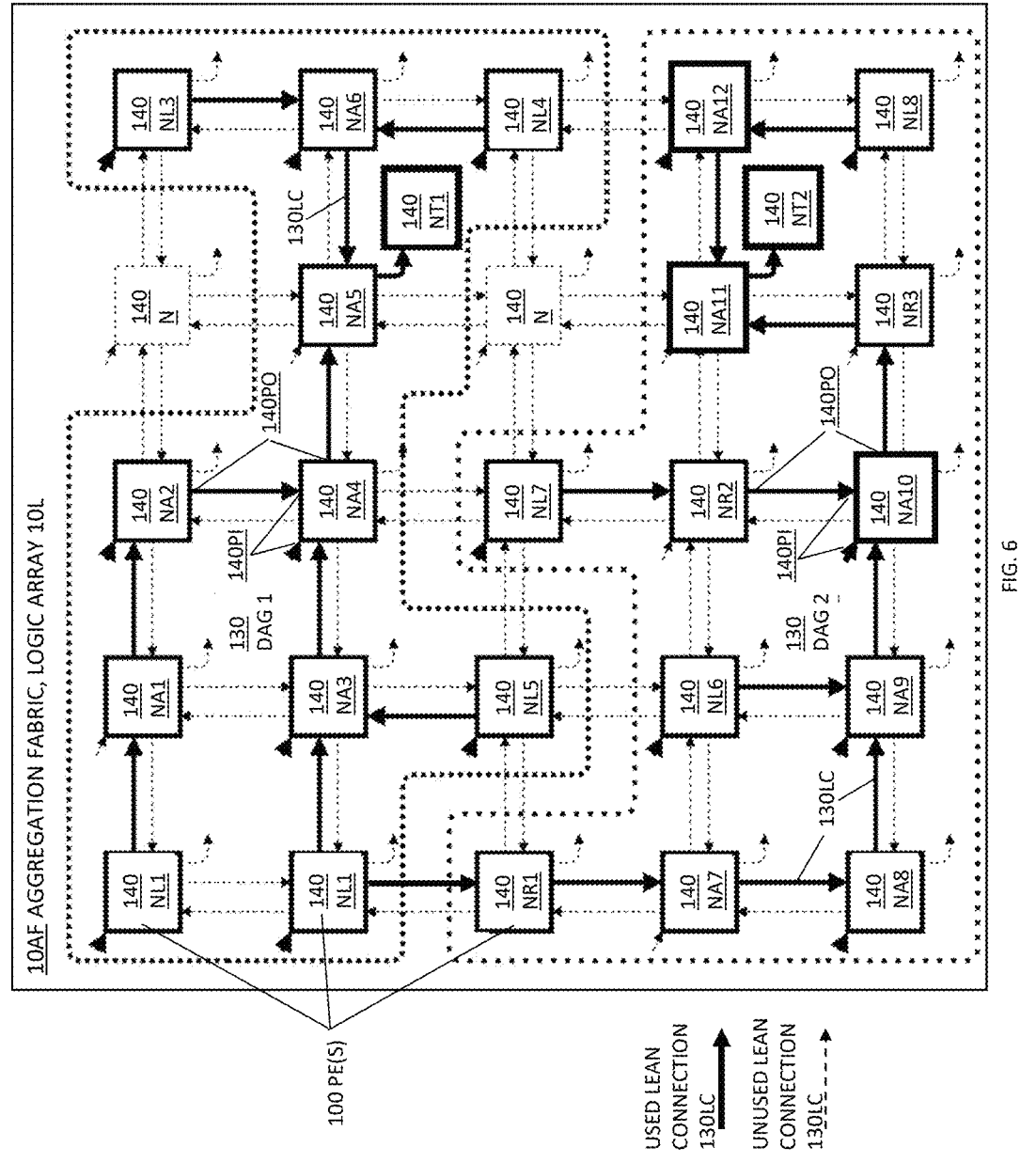

6 portion of the specification. The invention, however, both as to organization and method of operation, together with objects, features, and advantages thereof, may best be understood by reference to the following detailed description when read with the accompanying drawings in which:

FIG. 1 is a block diagram, depicting a computing device which may be included in a system for aggregating event occurrence indications, according to some embodiments;

FIG. 2 is a block diagram depicting an example for implementing a system 10 for aggregating event occurrence indications on a computing platform according to aspects of some embodiments of the invention;

FIG. 3A is a block diagram depicting an example for implementation of an event aggregation fabric, that may be included in the system for aggregating event occurrence indications, according to some embodiments of the invention;

FIG. 3B is a block diagram depicting another example for implementation of an event aggregation fabric, that may be included in the system for aggregating event occurrence indications, according to some embodiments of the invention;

FIG. 4 is a table, describing a logical function of a deficit counter, which may be used within aggregation nodes of the present invention, according to some embodiments;

FIG. 5 is a graph, showing simulated results utilizing the system for aggregating event occurrence indications, according to some embodiments of the invention;

FIG. 6 is a block diagram depicting an example of implementation of the aggregation fabric (e.g., as depicted in FIG. 3A or FIG. 3B) on a reconfigurable IC, according to aspects of the present invention;

FIG. 7 is a flowchart, depicting a method of aggregating indications in a processing platform, according to aspects of the present invention.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

FIG. 1—Computing Device

Reference is now made to FIG. 1, which is a block diagram depicting a computing device, which may be included within an embodiment of a system for aggregation of event occurrence indications in a computing platform, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task, or script. Executable code 5 may be executed by processor or controller 2 possibly under control of operating system 3. For example, executable code 5 may be an application that may configure aggregation of event occurrence indications on a computing platform, as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be, or may include for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to the computing platform may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components, or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

FIG. 2

FIG. 2 is a block diagram depicting a non-limiting example for implementation of a system 10 for aggregating event occurrence indications on a computing platform 10CP, according to aspects of the invention.

System 10—Computing Platform 10CP Duality

According to some embodiments, system 10 may be integrated or included in the underlying computing platform 10CP for distributed computational tasks. For example, and as depicted in FIG. 2, computing platform 10CP may be implemented as a reconfigurable IC chip, which may also include system 10. In such embodiments, system 10 may be configured to monitor and aggregate indications of event occurrences in computing platform 10CP, e.g., in reconfigurable IC chip 10CP. In such embodiments, the terms computing platform 10CP and IC 10CP may be used interchangeably.

Additionally, or alternatively, system 10 may be the same as computing platform 10CP. The terms system 10 and computing platform 10CP may therefore be referred to herein interchangeably, according to context.

As shown in the example of FIG. 2, IC chip 10CP may provide a hardware foundation for dynamically configurable processing operations.

Within system 10 (e.g., IC chip 10CP), a logic array 10L may include multiple processing elements (PEs) 100 arranged in a configurable structure. As explained herein, PEs 100 may be dynamically programmed to perform various computational tasks based on system requirements. Each PE 100 may function as an independent computational unit capable of executing specific operations or serving specialized roles within the overall processing framework.

As explained herein, certain PEs 100 may be designated as task initiation points, adapted to initiate operations in the reconfigurable IC 10CP.

According to some embodiments, groups of one or more PEs 100 may function as sources or "source modules", also referred to as source PEs 100. Source PEs 100 may be adapted to emit indications 100IND regarding occurrence of events of specific types 100ET pertaining to performed tasks or subtasks.

Event indications 100IND may be transmitted as electrical signals (e.g., pulse signals) or communication messages through dedicated lean communication pathways (e.g., single-wire connections, point-to-point optical connections, and the like) in the computing platform 10CP, to indicate occurrence of specific events, such as completion of specific tasks by source modules (PEs) 100SR.

Additionally, or alternatively, certain PEs 100 may be designated as target modules 100TR, which may be referred to as target PEs 100TR in the context of a reconfigurable IC implementation. Target modules (e.g., target PEs) 100TR may be regarded as logical units adapted to make use of the aggregated outcomes of respective dictated tasks or subtasks.

Use Cases for Target PEs Controlling Processing Workflow

In some embodiments, target modules (e.g., target PEs) 100TR may be configured to control a processing workflow in computing platform 10CP based on a global indication of occurrence of events from the source module (e.g., source PEs) 100SR.

The term "processing workflow" may be used in this context to indicate execution of a program, process or thread on computing platform 10CP, e.g., as part of a software-based application, a dataflow implementation in hardware, a portion thereof or any combination thereof.

For example, target PEs 100 may anticipate a response from a plurality of source PEs 100, to determine completion of a first task, and commence execution of a second, subsequent task.

In another example, target modules (target PEs) 100TR may anticipate the response from the plurality of source PEs 100, to initiate reconfiguration of one or more PEs in a logical array 10L of a reconfigurable IC computing platforms 10CP.

In another example, target PEs 100 may receive a plurality of distributed computation outcomes from a plurality of source PEs 100, to perform subsequent calculation based on this input.

In another example, target modules (e.g., target PEs) 100TR may receive a plurality of acknowledgement indications from a respective plurality of source modules (e.g., source PEs) 100SR, indicating reception of a first type of message, before proceeding to broadcast a second type of message to these source modules (e.g., PEs) 100SR.

Event Aggregation Fabric 10AF

As shown in FIG. 2, an event aggregation fabric 10AF may be implemented within system 10, e.g., as part of reconfigurable integrated circuit 10CP. Event aggregation fabric 10AF may be configured to collect and consolidate event indications 100IND from the distributed source PEs 100.

Event aggregation fabric 10AF may contain, or may be configured as one or more Directed Acyclic Graphs (DAGs) 130, where each DAG 130 may contain one or more interconnected nodes 140N.

In the non-limiting example where system 10 is implemented on a reconfigurable IC, each node may include, or may be implemented by a group of one or more PEs within the logic array 10L.

Each DAG 130 may include at least one terminal node 140 (denoted 140NT) that may serve as a final stage in accumulating indications 100IND for occurrence of events of at least one specific type 100ET at source modules (e.g., source PEs) 100SR associated with that DAG 130. Terminal node 140NT may produce a global indication signal 100GL for that specific event type 100ET, and route or transfer the global indication signal 100GL to a respective target PE 100TR that may expect the global indication 100GL to control a processing workflow of the IC.

For example, target module (e.g., PE) 100TR may rely on global indication 100GL to determine completion of a first computational process, e.g., as part of executing a software-based application or running a dataflow in hardware. Target module 100TR may thus choose to initiate a new computational process based on the completion of the first computational process.

In another example, target module (e.g., PE) 100TR may rely on the global indication 100GL to determine completion of the first computational process, as part of executing a software-based application or running a dataflow in hardware, to initiate reconfiguration of one or more modules or PEs 100 of the reconfigurable IC 10CP, to perform a different computational process.

Reconfiguration Manager 110

Pertaining to the non-limiting example where system 10 is implemented on a reconfigurable IC, system 10 (e.g., reconfigurable integrated circuit 10CP) may include a reconfiguration manager 110 module. As explained herein, reconfiguration manager 110 may be configured to coordinate task distribution and resource allocation across computing platform 10CP.

For example, reconfiguration manager 110 may be communicatively connected to an on-chip processor 10PR within the reconfigurable integrated circuit 10CP. Additionally, or alternatively, the reconfiguration manager 110 may be communicatively connected to an off-chip computing device (e.g., computing device 1 of FIG. 1) or an off-chip host processor 20PR (e.g., such as processor 2 of FIG. 1).

Processor 10PR/20PR may dictate functionality or tasks 110T for the reconfigurable integrated circuit 10CP via the reconfiguration manager 110. Reconfiguration manager 110 may include a task distribution module 123 configured to identify tasks for execution within the IC, and segment given functionalities or tasks 110T, as dictated by processor 10PR/20PR, into one or more subtasks 123ST. Subtasks 123ST may be components of the processing workflow. For example, subtasks 123ST may be a group of software threads running the same instructions and these threads may together form part of the processing workflow of a program.

In some embodiments, task distribution module 123 may analyze incoming workloads and determine optimal distribution of computational tasks 110T or subtasks 123ST across the available PEs 100 in computing platform 10CP (the reconfigurable IC 10CP).

Reconfiguration manager 110 may also include a resource allocation module 126 configured to allocate one or more PEs 100 to perform each of the subtasks 123ST.

For example, resource allocation module 126 may allocate unique subsets of the plurality of PEs 100 as source modules 100SR, to perform each of the identified subtasks 123T. Resource allocation module 126 may subsequently monitor system utilization and dynamically reconfigure logic array 10L to meet performance requirements. Resource allocation module 126 may also allocate one or more (e.g., a group of) PEs 100 of the IC as target modules 100TR.

Based on the allocation of PEs 100 as source modules 100SR and/or target modules 100TR, reconfiguration manager 110 may configure, or define nodes 140N and arcs (e.g., lean connections 130LC) of DAG 130.

For example, reconfiguration manager 110 may configure aggregation nodes 140NA of DAG 130 to aggregate indications of event notification from said source nodes 100SR (e.g., manifested as cue signals 140S1 of leaf nodes 140NL). Reconfiguration manager 110 may configure terminal nodes 140NT to generate a global notification signal 100GL, representing a count of notification events by the source modules of the IC, based on a predetermined number of expected indications of event occurrences. Reconfiguration manager 110 may configure terminal nodes 140NT to propagate, or transfer the global notification signal 100GL to the at least one target module 100TR, so as to control a processing workflow in the reconfigurable IC computing platform 10CP based on the global notification signal 100GL.

Additionally, or alternatively, reconfiguration manager 110 may notify at least one target module 100TR regarding the number of events it is expected to receive from terminal nodes 140NT. Reconfiguration manager 110 may thus configure a behaviour of the aggregation fabric 10AF without having to change a structure or configuration of DAG 130.

The reconfiguration manager 110 may coordinate the configuration of the event aggregation fabric 10AF based on the allocated PEs 100. In other words, reconfiguration manager 110 may dynamically reconfigure event aggregation fabric 10AF to establish appropriate aggregation pathways that correspond to the current task distribution and resource allocation configuration.

For example, reconfiguration manager 110 may configure the event aggregation fabric 10AF to include at least one DAG 130, according to the allocated source modules (e.g., subsets of PEs 100). DAG 130 may include a plurality of interconnected nodes 140N, adapted to aggregate indications 100IND of event occurrence (e.g., task completion) from source modules (e.g., source PEs) 100SR of logic array 10L, according to their dynamic allocation for execution of a given task 110S or subtask 123ST.

Additionally, or alternatively, reconfiguration manager 110 may coordinate the allocation of lean communication pathways (e.g., single-wire connections, point-to-point optical connections, and the like) between PEs 100 that implement the nodes 140N of the DAG 130, thereby establishing an optimally interconnected graph structure. In this context, "optimal" may refer to a configuration that minimizes communication latency between aggregation nodes while maximizing the efficiency of event signal propagation through the DAG hierarchy, potentially reducing the total number of required wire connections.

The allocation of these lean connections 130LC (e.g., single-wired connections, point-to-point optical connections) may be dynamically adapted by reconfiguration manager 110 to support dynamic reallocation of PEs 100 for tasks 110T and subtasks 123ST. In other words, reconfiguration manager 110 may reconfigure the communication topology of aggregation fabric 10AF in response to changing task distributions and resource assignments across the computing platform (reconfigurable IC) 10CP.

For example, reconfiguration manager 110 may form multiple DAGs 130 based on task distribution requirements. The reconfiguration manager 110 may dynamically adjust the interconnection patterns between nodes 140N to establish distinct aggregation pathways that may correspond to different computational workflows or event types 100ET within computing platform 10CP. The number of distinct, or interconnected DAGs 130 may not be limited and may be determined by reconfiguration manager 110 to optimally facilitate aggregation of event occurrence notifications of interest, throughout computing platform 10CP.

In this context, "optimal aggregation" may refer to the efficient collection of event occurrence notifications across the computing platform 10CP. Reconfiguration manager 110 may dynamically determine the number and structure of DAGs 130 to best suit the current task distribution and event types of interest. This optimization process may involve creating multiple interconnected DAGs 130 to handle different event types, or to segregate or integrate event flows based on system topology or processing requirements. Reconfiguration manager 110 may, for example, adjust the DAG 130 configurations to minimize latency, reduce congestion, minimize resource utilization, and ensure balanced distribution of event aggregation workload across fabric 10AF.

Event Types 100ET

As explained herein, DAG 130 may be configured to generate a global indication signal, representing an aggregation, or a count of event occurrence indications, pertaining to various types 100ET in the source modules (e.g., source PEs) 100SR associated with that DAG 130.

Within the reconfigurable logic array 10L, event types 100ET may represent predefined categories of occurrences that may arise during computational operations performed by PEs 100. Event types 100ET may encompass various operational states and conditions that the processing elements 100 may encounter during task execution.

For example, event types 100ET may include task completion events, which may indicate successful, or unsuccessful termination of assigned computational operations. DAG 130 may produce a global indication, or acknowledgement signal 100GL representing completion of all subtasks 123ST by the source modules (e.g., source PEs) 100SR associated with that DAG 130. DAG 130 may subsequently transfer global indication 100GL to a designated target PE 100TR that may expect the global indication 100GL to control a processing workflow of the IC.

In another example, event types 100ET may include error events that may signal exceptional conditions or failures during processing operations.

In another example, event types 100ET may encompass timeout events that may indicate when processing operations exceed predetermined time limits, as well as resource availability events that may signal changes in system resource states. Other examples for event types 100ET may also be possible.

Event Monitoring

Nodes 140N may be implemented by one or more PEs 100 within logic array 10L. PEs 100 of these nodes 140N may generate event indications 100IND through monitoring mechanisms that may track the progress and status of assigned computational tasks.

For example, a PE 100 may continuously evaluate task 110T/subtask 123ST execution conditions and may generate event indications 100IND when predetermined criteria are met. The monitoring PE 100 may emit event indications 100IND as electrical signals or data messages that may convey information about the occurrence of specific event types 100ET.

FIG. 3A, FIG. 3B

Reference is now made to FIG. 3A which is a block diagram depicting a simplified example for implementation of an event aggregation fabric 10AF, that may be included in the system 10 for aggregating event occurrence indications, according to some embodiments of the invention. Reference is also made to FIG. 3B, which is a block diagram depicting another, more elaborate example for implementation of an event aggregation fabric 10AF.

In the example depicted in FIG. 3A, event aggregation fabric 10AF may include at least one (e.g., exactly one) DAG 130, which is adapted to accumulate indications 100IND of event occurrence from a plurality of source modules (e.g., PEs) 100SR (denoted 100SR-1 through 100SR-3). Leaf nodes 140NL may serve as data collection points at the periphery of DAG 130, adapted to collect event indications 100IND from respective dedicated source modules 100SR via at least one input port 140PI.

Leaf nodes 140NL may subsequently produce electrical cue signals 140S1 indicating collection of event indication 100IND, and transmit cue signal 140S1 via an output port 140PO as input to aggregation nodes 140NA and/or relay nodes 140NR through preconfigured lean connections 130LC.

As explained herein, aggregation node(s) 140NA may receive cue signal 140S1 via at least one (e.g., a plurality of) input port 140PI, and apply predetermined logic to produce output electrical cue signals 140S2 based on the received input cue signal(s) 140S1. Aggregation node 140NA may then propagate output cue signal(s) 140S2 via one or more output ports 140PO towards a preconfigured terminal node 140NT of DAG 130 either directly, or via one or more additional aggregation nodes 140NA and/or relay nodes 140NR.

As shown in FIG. 3A, DAG 130 may include aggregation nodes 140NA connected in sequence, e.g., as two or more cascades or layers, where each layer is adapted to aggregate cue signals 140S1/140S2 from preceding layers, towards a terminal aggregation node 140NA, also referred to herein as a "terminal node 140NT".

Terminal node 140NT may subsequently generate a global indication signal 100GL representing a count, or accumulation the occurrence of event indications across multiple source modules 100SR that are associated with DAG 130. Terminal node 140NT may provide global indication signal 100GL to at least one respective target module 100TR. Target module 100TR may, in turn, utilize the aggregated, global indication 100GL to coordinate subsequent processing operations of computing platform 10CP, or to determine an overall status of computing platform 10CP, based on the collective event information from the distributed source modules 100SR.

As shown in the example depicted in FIG. 3B, the event aggregation fabric 10AF includes two DAGs 130 (denoted 130D1, 130D2), that may work in conjunction to process incoming event indications 100IND, pertaining to one or more (e.g., a plurality of) event types 100ET, from distributed source modules (e.g., PEs) 100SR within logic array 10L.

DAG Node Types

According to some embodiments, DAG 130 may include a hierarchical network structure with one or more types of specialized nodes 140N. Nodes 140N may be interconnected through lean (e.g., single-wired) connections, as illustrated in the examples of FIG. 3A, FIG. 3B and FIG. 4. As explained herein, DAG 130 may provide a dynamically reconfigurable framework for collecting, processing, and aggregating event indications 100IND from distributed processing elements 100 within computing platform 10CP (e.g., within logic array 10L of reconfigurable IC 10CP). As shown in FIG. 3B, the directed acyclic graph 130 may include multiple node types that may serve distinct functional roles within the event aggregation fabric 10AF.

Leaf nodes 140NL may serve as data collection points at the periphery of the directed acyclic graph 130. Each leaf node may be adapted to collect event indications 100IND from at least one (e.g., a single) dedicated source module 100SR, such as a PE 100 or a subset of PEs 100 in logic array 10L. The leaf node 140NL may subsequently produce an electrical cue signal 140S1, such as a single-cycle pulse signal, indicating collection of that event indication 100IND. Leaf node 140NL may transmit or propagate cue signal 140S1 as input to an aggregation node 140NA through a preconfigured lean connection 130LC, e.g. a single-wired connection.

An aggregation node 140NA may receive input cue signals 140S1 originating from one or more (e.g., multiple) leaf nodes 140NL and/or from one or more other aggregation nodes 140NA, via one or more (e.g., a plurality of) input ports 140PI.

As explained herein, the aggregation node 140NA may apply predetermined logic, also referred to herein as generation rule(s) 200GR, to produce one or more output electrical cue signals 140S2 based on the received input cue signal(s) 140S1. The aggregation node 140NA may then emit output cue signal(s) 140S2 via one or more output ports 140PO. The aggregation node 140NA may thus transmit or propagate the output cue signal(s) 140S2 towards a preconfigured terminal node 140NT of DAG 130 either directly, or via one or more additional aggregation nodes 140 and/or relay nodes, through preconfigured lean connections 130LC.

Notations 140S1 and 140S2 are generally used herein to respectively indicate input cue signals and output cue signals in aggregation nodes 140NA. However, it may be appreciated that in the context of the aggregation fabric's interconnected network, output of one node 140N may be regarded as input to another. Therefore, 140S1 and 140S2 may be used interchangeably, according to context.

Relay nodes 140NR may facilitate data transmission across the aggregation fabric 10AF network, and may forward processed information between different sections of the DAG 130 through lean (e.g., single-wire) connections. In some cases, relay nodes 140NR may also provide connectivity between nodes of different DAGs 130, enabling cross-DAG communication of cue signals 140S2 within event aggregation fabric 10AF.

Terminal nodes 140NT may represent final aggregation points in the directed acyclic graph 130. The terminal nodes 140NT may collect the aggregated cue signals 140S2 to generate global indication signals 100GL representing a count, or accumulation the occurrence of events across multiple source modules 100SR.

Generation of cue signals 140S1, 140S2 and global indication signal 100GL may be dictated by generation rules 200GR, as elaborated further herein.

Description of Specific Example in FIG. 3B

In the example of FIG. 3B, each type (solid, dotted and dashed) of bold arrows represents handling of event aggregation of a respective type 100ET.

A first DAG 130 (denoted 130D1) may be configured to receive event indications 100IND from various source modules 100SR (100SR-1-4) pertaining to all event types 100ET. Each aggregation node 140NA within DAG 130D1 may handle aggregation of events pertaining to one or more event types 100ET (corresponding to solid, dotted and/or dashed bold arrows).

In this example of FIG. 3B, at least one terminal node of DAG 130D1 is adapted to transfer respective output cue signals as global indication signals 100GL to at least one respective target module 100TR. Global indication signals 100GL of DAG 130D1 may, for example, be global acknowledgement signals representing an overall, or aggregated indication of termination of one or more second types of tasks 100T in source modules 100SR (100SR-1-4) associated with, or communicatively connected to DAG 130D1.

As also illustrated in the example of FIG. 3B, a second DAG 130 (denoted 130D2) may be configured to handle event indications 100IND of a specific (e.g., single) type 100ET, corresponding to the solid bold arrows. As shown in FIG. 3B, a terminal node of the second DAG 130D2 may be configured to transfer its output cue signal 140S2 to another, specific target module 100TR, as a global indication signal 100GL. Global indication signal 100GL may thus represent an aggregated, or overall indication of event occurrence, such as a global acknowledgement indication of termination of tasks 100T of a respective type 100ET in source modules 100SR (e.g., 100SR-5) which are communicatively connected to DAG 130D2, and/or source modules 100SR (e.g., 100SR-1 through 100SR-4) that are associated with DAG 130D1 (via relay nodes 140NR).

In the example of FIG. 3B, a second DAG 130 (130D2) may operate in parallel with the first DAG 130D1 to provide additional aggregation capabilities within the event aggregation fabric 10AF. In this example, DAG 130D2 may be configured to receive event indications 100IND from additional source modules 100SR (100SR-5), which may represent PEs 100 that may (or may not) be distinct from those connected to the first DAG 130D1.

In addition to receiving direct event indications 100IND from its designated source modules 100SR, DAG 130D2 may also be configured to receive intermediate signals from various hierarchical levels of the first DAG 130D1 via relay nodes 140NR. These intermediate signals may include input cue signals 140S1 from leaf nodes 140NL within DAG 130D1, as well as output cue signals 140S2 from aggregation nodes 140NA at different levels of the DAG 130D1 hierarchy. This cross-DAG connectivity may enable DAG 130D2 to incorporate aggregation results from the first DAG 130D1 while simultaneously processing its own dedicated event sources. Although DAG 130D1 and DAG 130D2 may be interconnected, the nature of this interconnection may be such as to rarely be used, thus allowing the resulting structure to be considered as to the most part, behaving as two independent DAGs 130.

Aggregation nodes 140NA of DAG 130D2 may apply their own generation rules 200GR to combine the received signals from both direct source modules 100SR and the intermediate signals from DAG 130D1. This multi-source aggregation capability may allow aggregation fabric 10AF flexibility in producing global indication signals 100GL that represent complex aggregation patterns of events across both DAG structures.

Deficit Counters

Aggregation nodes 140NA may be implemented in different configurations depending on the number of their input sources. For example, an aggregation node 140NA may be configured to receive input cue signals 140S1, representing event indications 100IND originating from two or more source modules 100SR simultaneously, to produce one or more output cue signals 140S2.

In each aggregation node 140NA, input cue signals 140S1 may include cue signals 140S1 from leaf nodes 140NL, output cue signals 140S2 from other aggregation nodes 140NA, cue signals 140S1/140S2 from relay nodes 140NR or any logical combination (e.g., AND, OR, NOT, etc.) thereof, as dictated by generation rules 200GR.

In each aggregation node 140NA, output cue signals 140S2 may be generated as a function of its input cue signals and/or a deficit count of these signals, as dictated by generation rules 200GR.

FIG. 4

Reference is also made to FIG. 4 which is a table, describing a logical function of a deficit counter 160, which may be used within aggregation nodes 140NA according to some embodiments of the present invention.

Deficit counter 160 may serve to maintain an accurate count of input cue signals 140S1 that have been received by the aggregation node 140NA, but have not yet been transmitted as output cue signals 140S2.

For example, cue signals 140S1/140S2 may be formed as single-cycle pulse signals. In such embodiments, deficit counter 160 may track the difference between the number of input cue signals (pulses) 140S1 received during a given time period (e.g., a predefined number of clock cycles) and the number of output cue signals 140S2 (pulses) that the aggregation node 140NA has been able to generate during that same time period.

Deficit counter 160 may be incremented when the aggregation node 140NA receives multiple input cue signals (e.g., pulses) simultaneously but can only generate a single output cue signal 140S2 (e.g., pulse) per that time period.

In a complementary manner, deficit counter 160 may be decremented when aggregation node 140NA generates an output cue signal 140S2 (e.g., pulse) during a time period (e.g., clock cycle), when no input cue signals 140S1 are received. In other words, aggregation node 140NA may decrement the deficit count 160, and generate an output cue signal at a predetermined timeframe, when (i) the deficit count is non-zero and (ii) a number of input cue signals (e.g., pulses) received in that timeframe is less than number of output cue signals generated in that timeframe.

Deficit counter 160 may thereby ensure that the total number of output cue signals 140S2 emitted over time eventually matches the total number of input cue signals 140S1 received over time.

In the example of FIG. 4, different conditions (A through G) of the Deficit Counter (DC) of a specific aggregation node 140NA are described.

Condition A is the DC's 160 initial condition, where no unattended input cue signals 140S1 (denoted 'Ack') have yet been received via one or more (e.g., a plurality of) input ports 140PI of the aggregation node 140NA. In this condition, aggregation node 140NA will not emit an output cue signal 140S2 via its output port 140PO.

Conditions B through F indicate conditions in which a respective number N (e.g., 1 through 5) of yet unattended input cue signals 140S1 have been received via one or more input ports 140PI of the aggregation node 140NA within the predetermined time period (e.g., single clock cycle). In these cases, aggregation node 140NA will (i) emit an output cue signal 140S2 (e.g., pulse) via at last one of its output ports 140PO, and (ii) increment its value by (N-1), where N is greater than 1.

In other words, aggregation node 140NA may increment DC 160 when a number of input cue signals received in a predetermined timeframe exceeds the number of output cue signals generated in that timeframe.

As explained herein, at least one aggregation node 140NA may be configured to handle aggregation of events of multiple types. For example, aggregation node 140NA may be configured to increment (or decrement) DC 160 in response to input (or output) of cue signals 140S1/140S2 pertaining to a plurality of types.

Additionally, or alternatively, at least one aggregation node 140NA may include a plurality of separate deficit counters 160, each dedicated to handling a specific type 100ET of event. For example, aggregation node 140NA may maintain a first deficit count 160 of input cue signals 140S1/140S2, pertaining to a first type of events (e.g., termination or completion of a first type of task 100T in source modules 100SR) and maintain at least one second deficit count 160 of input cue signals 140S1/140S2, pertaining to at least one respective, second type of events (e.g., termination or completion of at least one second type of task 100T in source modules 100SR). Aggregation node 140NA may then generate output cue signal 140S2 based on the first deficit count and the at least one second deficit count, in accordance with generation rule 200GR.

FIG. 5

Reference is also made to FIG. 5 which is a graph, showing simulated results utilizing the system for aggregating event occurrence indications, according to some embodiments of the invention, for example to provide a mechanism of maintaining and delivering an overall count of events. The presented graph illustrates operation of event aggregation fabric 10AF over time, demonstrating the behavior of various components including aggregation nodes and deficit counters. The x-axis represents clock cycles, while the y-axis shows event counts.

The line marked with stars, labelled "Total Arrived at FT", represents the cumulative number of events that have reached their Final Target (FT, e.g., terminal node 140NT), showing the overall progress of event aggregation through the DAG 130.

The rows of dots below the x-axis (TTP1 through TTP8) represent individual event occurrences from different source modules 100SR, corresponding to input pulse signals 140S1 received by leaf nodes 140NL.

The line marked with hexagons, "Total TTP so far", indicates the total number of input event indications 100IND received by leaf nodes 140NL of aggregation fabric 10AF, corresponding to events generated by source modules 100SR (also referred to herein as Target Termination Points (TTPs)).

The line marked with triangles, "Total in DC", represents the sum of all Deficit Counter (DC) 160 values across the aggregation nodes 140NA in the fabric. This line fluctuates as events are received and sent out by the nodes of DAG 130, demonstrating how the deficit counters 160 handle bursts of incoming events. It will be noted that the "Total TTP so far" line is bounded by the "Total Arrived at FT" line, illustrating that the events that arrive at the final target (e.g., terminal node 140NT) can lag, but not exceed the events delivered into DAG 130. The "Total in DC" line represents the numerical difference between the "Total TTP so far" line and the "Total Arrived at FT" line.

Previously mentioned lines of FIG. 5 (e.g., "Total TTP so far", "Total Arrived at FT", "Total in DC") describe the operation of an example DAG 130 as a whole. The subsequent lines (e.g., "FDAG3_Out" and "FDAG3_DC") describe the operation of a single aggregator node 140NA that received event occurrence indications (denoted TTP3 and TTP8) as input from two respective source modules 100SR.

The line marked with squares, labelled "FDAG3_Out", shows the output pulse signals 140S2 generated by the specific aggregation node 140NA, illustrating how the node processes input signals and manages its deficit counter 160.

The line marked with diamonds, "FDAG3_DC", represents the deficit counter 160 value for the specific aggregation node 140NA, showing how it increments and decrements over time based on input and output events.

This graph effectively demonstrates the fabric's ability to handle bursty event patterns, with the deficit counters 160 accumulating during high-input periods and gradually releasing events during quieter periods, ensuring all events are eventually delivered without loss of information.

Formulation Module 150

As shown in FIG. 3B, aggregation node 140NA may employ a formulation module 150 to implement predetermined generation rules 200GR. Formulation module 150 may thereby produce output cue signals 140S2 based on incoming electrical signals and the current value of deficit counter 160.

In some embodiments, formulation module 150 may evaluate the state of input ports 140PI to determine whether input cue signals have been received for a current clock cycle. As shown in the example of FIG. 4, formulation module 150 may generate an output cue signal 140S2 when input cue signals 140S1 are received, regardless of the deficit counter 160 value.

Additionally, or alternatively, formulation module 150 may generate an output pulse signal 140S2 when no input pulse signals are received but the deficit counter 160 con-tains a non-zero value, enabling aggregation fabric 10AF to process previously received event indications 100IND.

Generation Rules 200GR Examples

Generation rules 200GR may dictate specific formats and logic conditions under which formulation module 150 may generate cue signals 140S2 and/or global indication signals 100GL. Such signals 140S2/100GL may be different than the mechanism of maintaining and delivering an overall count of events as depicted in FIG. 5. In other words, formulation module logic 150 may apply generation rules 200 to determine the appropriate timing, format, destination and conditions for generating output pulse signals 140S2 by aggregation node 140NA, serving as terminal 140NT or nonterminal nodes, based on the one or more received input cue signals 140S1 and the accumulated deficit count 160.

Emitting Output Based on Deficit Count

According to some embodiments, generation rules 200GR may dictate that at least one aggregation should generate an output cue signal 140S2 (e.g., a pulse signal) based, at least in part, on the deficit count 160C.

In other words, formulation module logic 150 may evaluate a current state of input connections (e.g., input cue signals 140S1) and the value of the deficit counter 160 to determine when, and how to generate output pulse signals 140S2.

For example, aggregation node 140NA may generate an output pulse signal 140S2 when input pulse signals are received for a current clock cycle. Additionally, the aggregation node 140 may generate an output pulse signal when no input pulse signals are received but the deficit counter 160 contains a non-zero value, thereby enabling processing of previously accumulated pulse signals.

Destination (Single, Broadcast, Multicast)

In some embodiments, generation rule 200GR may determine a format of transmission of output cue signal 140S2 in terms of output cue signal 140S2 destination(s).

For example, generation rule 200GR may dictate a single transmission, a broadcast transmission, or a multicast transmission of output cue signal 140S2, to one or more predetermined, subsequent aggregation nodes 140NA and/or specific target modules 100TR in DAG 130, via predetermined single, or multiple output ports 140PO of that aggregation node 140NA.

In such embodiments, output cue signal 140S2 may be transmitted to multiple subsequent aggregation nodes 140NA within aggregation fabric 10AF via multiple, respective output ports 140PO of aggregation node 140NA, allowing parallel processing pathways that can accommodate complex event aggregation scenarios and varying system requirements.

In another example, generation rule 200GR may dictate that the selected output ports are directed toward specific, respective terminal nodes 140NT of DAG 130.

Functions for Unification or Separation of Event Types 100ET

Additionally, or alternatively, generation rule 200GR may dictate an output format of output cue signals 140S2 in terms of unification or separation of event types 100ET.

For example, generation rule 200GR may dictate transmission of output cue signals 140S2, pertaining to a first event type, and at least one second event type via separate, dedicated output ports 140PO of the aggregation node 140NA.

In another example, generation rule 200GR may dictate a logic function for emitting output cue signals 140S2 based on input cue signals 140S1 pertaining to a first event type, and at least one second event type. Such logic may include, for example: (i) a function of a deficit count 160 pertaining to the first event type 100ET, (ii) a function of a deficit count 160 pertaining to the at least one second event type 100ET, (iii) a weighted function of input cue signals 140S1 from preceding aggregation nodes 140NA, (iv) a weighted function of input cue signals 140S1 from leaf nodes 140NL, and (v) any combination thereof.

For example, generation rule 200GR may dictate that aggregation node 140NA would emit an output cue signal 140S2 (e.g., a single-cycle pulse) when: [(a first deficit counter 160, pertaining to a first event type 100ET reaches a first value) AND (a second deficit counter, pertaining to a second event type 100ET reaches a second value) OR (an input cue signal 140S1 is received)]. It may be appreciated that examples for such logical functions are abundant, and may be specifically tailored according to specific needs.

In another example, generation rule 200GR may dictate transmission of an encoded combination of output cue signals 140S2 pertaining to the first event type 100ET and the at least one second event type 100ET, as elaborated herein, via a common output port 140PO of the aggregation node 140NA.

Prioritization Schemes

Additionally, or alternatively, generation rules 200 may include prioritization schemes for handling multiple simultaneous input cue signals 140S1/140S2 of different event types 100ET and/or originating from different source modules 100SR. For example, aggregation node 140NA may prefer to emit output cue signals 140S2 representing occurrence of events of a first event type 100ET, over output cue signals 140S2 pertaining to events of a second, lower priority event type 100ET.

Additionally, or alternatively, generation rules 200 may dictate calculation of prioritization based on one or more parameters. Aggregation node 140NA may subsequently be configured to prioritize emission of output cue signals 140S2, representing occurrence of specific events, based on these parameters.

For example, parameters for calculation of priority may include: (i) a deficit count of a first event type, (ii) a deficit count of at least one second event type, (iii) a metric of fairness (e.g., avoiding starvation) between an event of the first type 100ET and at least one second event of a second type 100ET, (iv) time of arrival of input cue signals 140S1 pertaining to the first event type, (v) time of arrival of input cue signals 140S1 pertaining to the at least one second event type, or any combination thereof.

Terminal Node Specificity

Additionally, or alternatively, generation rules 200GR may dictate terminal node specificity. For example, generation rules 200GR may define a terminal node 140NT as serving a final stage in accumulating indications 100IND for the occurrence of events of a specific (e.g., single) event type 100ET (e.g., acknowledgement of reception of a message). The terminal node 140NT may thereby output global indication signals 100GL representing aggregation of occurrence of events for that specific event type 100ET (e.g., message received by all source modules 100SR).

In another example, generation rules 200GR may dictate that each terminal node 140NT may output at least one global indication signal 100GL representing a logical combination (e.g., AND, OR, NOT, etc.) of events pertaining to different types 100ET. For example, indication signal 100GL may indicate completion of N1 iterations of a first task, by a first group of source modules 100SR AND completion of N2 iterations of a second task, by a second group of source modules 100SR.

Physical Output Signal Format

According to some embodiments, event aggregation fabric 10AF may be configured to employ various communication protocols and signal formats to propagate cue signals 140S2 over lean communications between aggregation nodes 140NA.

For example, the communication infrastructure of aggregation fabric 10AF may utilize lean connections 130LC of varying widths, ranging from single-wire implementations for basic event signaling to multi-wire configurations for more complex data transmission. For instance, a single-wire connection may support 1-bit communication for simple event occurrence notifications, while dual-wire connections may enable 2-bit communication capable of distinguishing between multiple event types or states.

The timing and encoding characteristics of the propagated signals may vary based on the selected communication protocol and system requirements. Cue signals 140S2 may, for example, be implemented as electrical signals of predetermined duration, such as single-clock cycle pulses that represent discrete event occurrences, or as more complex pulse trains where the temporal positioning of pulses encodes specific event types 100ET.

The encoding schemes may include, for example, amplitude-based or pulse-length modulation to differentiate between event types. Additionally, or alternatively, aggregation fabric 10AF may employ binary coding patterns where specific bit sequences represent different events (e.g., 1000 for event type A, 1100 for event type B, etc.), or positional encoding where the location of a pulse within a sequence indicates the event type.

Additionally, or alternatively, aggregation fabric 10AF may employ other types of encoding schemes, such as Morse-like code, over lean, single wire connections, to aggregate indications of event occurrence across DAG 130.

Additionally, or alternatively, aggregation fabric 10AF may support established communication protocols such as Inter-Integrated Circuit (I2C), Universal Asynchronous Receiver-Transmitter (UART) over lean, multi-wire connections, providing standardized interfaces for event data transmission while maintaining the efficiency benefits of the lean communication architecture.

According to some embodiments, generation rules 200GR may dictate the specific implementation of the physical format of output cue signals 140S2, either globally, e.g., across all aggregation nodes 140NA, or locally, e.g., pertaining to specific subsets of aggregation nodes 140NA, specific DAGs 130, specific event types 100ET, and the like.

For example, generation rules 200GR may dictate a physical format of output cue signals 140S2. For example, generation rules 200GR may define a width of a lean communication arc (e.g., single wire for 1-bit communication, dual wire for 2-bit communication, etc.) between two aggregation nodes 140NA of fabric 10AF. Generation rules 200GR may further define allocation of data for each wire (e.g., each bit). For example, generation rules 200GR may allocate, or dedicate a first wire for communication pertaining to a first event type 100ET, a second wire for communication pertaining to a second event type 100ET, etc.

In another example, generation rules 200GR may dictate cue signals 140S2 to be electrical signals of predetermined duration, such as a single-clock cycle pulses, that may represent the occurrence of a specific detected event, such as completion of a specific subtask 123ST, acknowledgement of reception of a specific message, and the like.

In another example generation rules 200GR may require aggregation node 140NA to generate cue signal 140S2 so as to encode occurrence of events of specific types 100ET.

Such encoding may include, for example, representation of events of specific types 100ET by amplitude or length of electric pulses in cue signal 140S2.

In another example, generation rules 200GR may dictate that output cue signal 140S2 will be formed as a pulse train, where the encoding of occurrence of events of specific types 100ET corresponds to respective location of short pulses (e.g., single-cycle pulses) in the pulse train.

For example, output cue signal 140S2 may be implemented using a lean, two-wire communication whose binary coding can represent one of four possibilities: 00—No event; 01—Event type 100ET 'A'; 10—Event type 100ET 'B'; and 11—Event type 100ET 'C'.

In another example, output cue signal 140S2 may be implemented using a lean, 2-wired communication protocol such as Inter-Integrated Circuit (I2C), Universal Asynchronous Receiver-Transmitter (UART) protocol, and the like.

Additionally, or alternatively, generation rules 200GR may dictate that output cue signal 140S2 will be implemented using a lean, e.g., single-wire communication, bearing a sequence of pulses whose binary values may encode specific event types or combinations thereof, e.g., 0 (any length)—No event; 1000—Event type 100ET 'A; 1100—Event type 100ET 'B'; 1110—Event type 100ET 'C', etc.

Additionally, or alternatively, generation rules 200GR may dictate that output cue signal 140S2 will be implemented using a lean, e.g., single-wire communication where a location of a pulse within a sequence may indicate occurrence of an event of a specific type 100ET. For example, events may be represented by a 7-bit value, in which case a 128 long counter may be used to indicate occurrence of any combination of occurrence of event types 100ET. Other ways of encoding indications over lean communication may also be possible.

It may be appreciated that other forms and rules may be applied to generation of cue signals 140S2, according to specific requirements.

As explained herein, when aggregation node 140NA is not a terminal node 140NT of DAG 130, it may transfer the output cue signal 140S2 via a lean (e.g., single wire) connection to a subsequent aggregation node 140NA of DAG 130, towards terminal node 140NT.

In a complementary manner, when aggregation node 140NA functions as a terminal node 140NT of the directed acyclic graph 130, it may transfer output cue signal 140S2 as a global indication signal 100GL to a target module (e.g., target PE) 100TR in the integrated circuit 10CP. The global indication 100GL may represent an aggregation, or count of occurrence of events (e.g., of a specific type) across multiple source modules (e.g., multiple PEs) 100SR. Target module 100TR may be, or may include a PE 100 that may be configured to utilize the aggregated, global indication 100GL so as to coordinate subsequent processing operations, or to determine overall system status, based on the collective event information from the distributed source modules 100SR.

Leaf Nodes' Signal Format

As explained herein, event aggregation fabric 10AF may include a plurality of leaf nodes 140NL positioned at a periphery of DAG 130, as shown in FIG. 3B and FIG. 6. Leaf nodes 140NL may serve as entry points for event indications 100IND into the aggregation network structure, providing a distributed collection mechanism that may interface directly with source modules (e.g., source PEs) 100SR throughout the computing platform 10CP (e.g., logic array 10L of IC 10CP).

Each leaf node may be configured to receive an indication of occurrence 100IND of an event of (e.g., detect the first type from a single source module (e.g., a single PE) 100SR of the integrated circuit 10CP. Each leaf node may monitor the operational state of the designated source module 100SR and detect when an event indication 100IND is generated by that source module 100SR. Each leaf node may subsequently generate an indicative cue signal 140S1 in response to receiving the event indication 100IND from its corresponding source module 100SR, in accordance with generation rules 200GR, as elaborated herein.

Each leaf node 140NL may be configured to transmit the indicative pulse signal 140S1 via lean (e.g., single wire) connection as an input pulse signal to a respective parent aggregation node 140NA in DAG 130.

As explained herein, DAG 130 may further include one or more relay nodes 140NR configured to facilitate signal routing between different sections of the aggregation fabric 10AF, as shown in FIG. 3B and FIG. 6. Relay nodes 140NR may provide reconfigurable pathways for pulse signals to reach designated destinations within the aggregation fabric 10AF network, enabling flexible routing configurations based on system requirements.

Each relay node 140NR may be configured to receive a relay rule 200RR that may define logic for relaying input pulse signals between an input port 140PI and an output port 140PO of the relay node 140NR, e.g., to implement connection between nodes 140N and/or DAGs 130 of fabric 10AF. Relay rule 200RR may specify routing conditions, signal processing parameters, and/or destination selection criteria that may govern how relay node 140NR handles or routes incoming cue signals 140S1/140S2.

For example, relay rule 200RR may include timing specifications that may determine when cue signals 140S1/140S2 may be forwarded from the input port 140PI to the output port 140PO. Relay rule 200RR may also include filtering criteria that may determine which types 100ET of cue signals 140S1/140S2 may be forwarded by relay node 140NR.

According to some embodiments, relay node 140NR may receive, via one or more input ports 140PI, one or more cue signals 140S1/140S2, e.g., as output of one or more leaf nodes 140NL or one or more first aggregation nodes 140NA.

Relay node 140NR may subsequently relay, or transfer the received one or more cue signals 140S1/140S2 via at least one output port 140PO, as input to a destination aggregation node 140NA or terminal node 140NT in aggregation fabric 10AF, according to the relay rule 200RR.

FIG. 6

FIG. 6 is a block diagram depicting an example of implementation of the aggregation fabric 10AF of FIG. 3B on a reconfigurable IC, according to aspects of the present invention.

In this example, aggregation fabric 10AF is made to match a logic array 10L of reconfigurable IC (computational platform 10CP), where the PEs 100 are arranged in a grid structure. The notation of PEs 100 was omitted in this diagram, for the sake of clarity.

In some embodiments, nodes 140N (e.g., leaf nodes 140NL, aggregation nodes 140NA, relay nodes 140NR, terminal nodes 140NT) may each be implemented by a respective PE 100 or a group of physically adjacent PEs 100. In such embodiments, the location of the depicted nodes may be aligned with the respective locations of their implementing PEs 100 in logic array 10L.

Additionally, or alternatively, nodes 140N may be implemented as additional, distinct logic, beside the PEs 100 of logic array 10L. In such embodiments, the location of nodes depicted in FIG. 6 may be regarded as skewed, or shifted from that of PEs 100 in logic array 10L. Any combination between these two options is also possible.

As shown, multiple directed acyclic graphs 130 (DAG 1, DAG 2) may be distributed across the logic array 10L, to aggregate event indications 100IND from various PEs 100 acting as source modules 100SR. In other words, aggregation fabric 10AF may be overlaid onto this grid structure to provide efficient collection pathways for event indications 100IND generated by the distributed source PEs 100.

In this distributed configuration, DAG 1 may include leaf nodes 140NL (leaf nodes 140NL1 through 140NL5) that may serve as collection points for event indications 100IND from specific source PEs 100SR. DAG 1 may also include multiple aggregation nodes 140NA (aggregation nodes 140NA1 through 140NA6) that may be positioned at various locations throughout the logic array 10L, to aggregate input signals 140S1 from leaf nodes 140NL, and produce corresponding output signals 140S2. Terminal node 140NT1 of DAG 1 may serve as the final aggregation point for events processed through this directed acyclic graph 130.

Similarly, DAG 2 may include leaf nodes (leaf nodes 140NL6 through 140NL8) positioned to collect event indications 100IND from additional source PEs 100, and aggregation nodes 140NA (aggregation nodes 140NA7 through 140NA12) distributed across different regions of the logic array 10L. The terminal node 140NT2 of DAG 2 may provide the final aggregation output for this directed acyclic graph 130.

According to some embodiments, aggregator nodes 140NA may also provide some of the functionality of other node types, such as leaf nodes 140NL, terminal nodes 140NT and relay nodes 140NR. For example, aggregator node 140NA2 (center of top row of FIG. 6) has a large arrow entering it from its top-left corner, indicating collection of an event indication 100IND (e.g., directly from a local PE100). In another example, an aggregator node 140NA may be configured to function as a relay node 140NR, e.g., by merely transferring cue signals 140S1/140S2 from an input port 140PI to an output port 140PO. In yet another example, an aggregator node 140NA may be configured to function as a terminal node 140NT, e.g., by generating, or providing global indication 100GL to a target module 100TR (not shown in this diagram).

The distribution of multiple directed acyclic graphs 130 across the logic array 10L may enable parallel processing of different event types 100ET or different categories of computational tasks. Each DAG 130 may handle aggregation of event indications 100IND from specific subsets of PEs 100, allowing for specialized processing based on task characteristics or geographical proximity within the logic array 10L.

Aggregation nodes 140NA within this distributed configuration may have configurable output directions that may be set by reconfiguration management module 110. For example, reconfiguration management module 110 may configure individual aggregation nodes 140N to direct their output signals toward specific destinations within the aggregation fabric 10AF, based on current task distribution requirements and system operational needs.

In some cases, the aggregation nodes 140 may have different output directions per event type 100ET, enabling the formation of complex networks within the aggregation fabric 10AF. For example, an aggregation node 140NA may route output signals for a first event type 100ET toward a first terminal node 140NT, while simultaneously routing output signals for a second event type 100ET toward a different terminal node 140NT or toward a different DAG 130.

FIG. 7

FIG. 7 is a flowchart, depicting a method of aggregating indications of event occurrence in a computing platform (e.g., an integrated circuit) 10CP, such as shown in FIG. 2. Embodiments of the method may include the following steps:

Step S1005 may include allocating a plurality of aggregation nodes in computing platform 10CP. As explained herein, e.g., in relation to FIG. 2, reconfiguration manager 110 may be configured to determine subtasks 123ST for execution as part of a software, or hardware-based processing workflow. For example, subtasks 123ST may be a group of software threads running the same instructions and these threads may together form part of the processing workflow of a program. Reconfiguration manager 110 may be configured to allocate, or dedicate processing specific elements PEs, or groups thereof, for performing these subtasks 123ST in the computing platform 10CP. These processing elements may constitute the source modules 100SR and target modules 100TR adapted to perform subtasks 123ST and/or utilize outcome of subtasks 123ST in computing platform 10CP.

Reconfiguration manager 110 may include at least one processor (e.g., processor 2 of FIG. 1) that may allocate various types of nodes 140N within the aggregation fabric 10AF. These nodes may include leaf nodes 140NL, aggregation nodes 140NA, relay nodes 140NR, and terminal nodes 140NT, as depicted in FIG. 3. During the allocation process, the at least one processor of reconfiguration manager 110 may designate specific processing elements 100 within a logic array 10L of computing platform 10CP, or auxiliary hardware blocks over logic array 10L, to serve as these nodes. Reconfiguration manager 110 may thereby establish foundational components of an event aggregation fabric such as 10AF of FIGS. 2, 3A, 3B.

Step S1010 may include interconnecting nodes 140N (e.g., aggregation nodes 140NA) by lean connections 130LC to form at least one DAG. Following the allocation of nodes, the reconfiguration manager 110 may establish lean (e.g., single-wire, dual wire) connections 130LC between the allocated nodes 140N to form one or more DAGs 130, as illustrated in FIGS. 2, 3A, 3B. As explained herein, these connections 130LC may be dynamically configured (e.g., enabled or disabled, as depicted in FIG. 6) based on the current task distribution and resource allocation within the logic array 10L. The DAG 130 structure may thereby dynamically determine a flow of cue signals (140S1/140S2) indicating event occurrence through aggregation fabric 10AF.

Step S1015 may include designating source modules 100SR and at least one target module in the computing platform: For example, at least one processor 2 of task distribution module 123 and resource allocation module 126 (of reconfiguration manager 110) may collaborate to designate specific PEs 100 as source modules 100SR (also referred to herein as Task Termination Points (TTPs)) and target modules 100TR for specific tasks 110T or subtasks 123ST.

Reconfiguration manager 110 may configure source modules 100SR to generate event indications 100IND, while target modules may be designated to receive aggregated, or overall event information (e.g., global indication 100GL), indicating occurrence of events (e.g., termination of sub-tasks 123ST) across a plurality of source modules 100SR associated with DAG 130.

Step S1020 may include configuring one or more (e.g., each) aggregation node 140NA in DAG 130 to perform subsequent steps S1020-A through S1020-F.

In step S1020-A, at least one processor of reconfiguration manager 110 may configure aggregation node 140NA to receive input cue signals (140S1/140S2) from one or more source modules 100SR or preceding nodes 140N via respective lean connections 130LC, and respective input ports 140PI. These input cue signals 140S1/140S2 may indicate occurrence of one or more events (e.g., pertaining to execution of subtasks 123ST) of at least one specific type in source modules 100SR. As shown in FIG. 3B, these signals may be received directly from source modules 100SR, from leaf nodes 140NL associated with these source modules 100SR, or other, preceding aggregation nodes 140NA in DAG 130.

In step S1020-B, at least one processor 2 of reconfiguration manager 110 may configure aggregation node 140NA to maintain a deficit count of the input pulse signals pertaining to the first type of events using its deficit counter 160, as elaborated herein.

In step S1020-C, at least one processor 2 of reconfiguration manager 110 may configure aggregation node 140NA to generate output cue signals 140S2 on a specific output port 140PO, based on (i) the maintained deficit count and/or (ii) generation rule 200GR, using formulation module 150, as explained herein.

In step S1020-D embodiments of the method may determine whether the current aggregation node 140NA also serves as a terminal node 140NT of the DAG 130.

If reconfiguration manager 110 has configured aggregation node as a terminal node 140NT (step S1020-E), then aggregation node 140NA may be configured to transfer the output pulse signal 140S2 as an aggregated, or global indication 100GL to the at least one target module 100TR. This aggregated, or overall indication represents occurrences of events of the specific type across multiple source modules 100SR associated with (e.g., connected to) a DAG 130 of aggregation fabric 10AF.

If the aggregation node 140NA is not a terminal node (step S1020-F), then aggregation node 140NA may be configured to transfer the output pulse signal 140S2 is transferred via a lean connection 130LC to a subsequent aggregation node in DAG 130, towards a terminal node 140NT, which may in turn be configured to transfer a global indication to a corresponding target module 100TR.

It may be appreciated that steps S1020-A to S1020-F may be individually applied to individual aggregation nodes 140NA, where one or more (e.g., each) aggregation node 140NA being provided an individualized configuration based on an individualized generation rule 200GR.

As explained herein, target module 100RT may subsequently control a processing workflow based on the obtained global indication 100GL. For example, target module 100RT may determine that all subtasks 123ST pertaining to a specific task have been executed by respective source modules 100SR based on global indication 100GL, and subsequently proceed to act on the result of these subtasks 123ST or proceed to a subsequent task or function in the processing workflow.

The invention claimed is:

1. An event aggregation fabric, configured as a Directed A-cyclic Graph (DAG), comprising one or more aggregation nodes interconnected by arcs implemented as lean connections, wherein each aggregation node in the DAG is defined as either a terminal node, representing a final aggregation point in the DAG, or as a non-terminal node, and wherein each aggregation node is configured to:

receive input cue signals, originating from one or more source modules, wherein each input cue signal indicates occurrence of an event in said source modules;

maintain a deficit count of the input cue signals, and generate an output cue signal, based on said deficit count wherein the deficit count represents a number of input cue signals that have been received but have not yet been transferred as output cue signals;

when the aggregation node is defined as a terminal node of the DAG, transfer the output cue signal as a global indication signal, representing an aggregation of occurrence of events in said source modules, to a specific target module of one or more target modules; and when the aggregation node is not defined as a terminal node, transfer the output cue signal via a lean connection to a subsequent aggregation node or relay node of the DAG, towards the terminal node, wherein the specific target module is configured to control a processing workflow based on said global indication.

2. The event aggregation fabric of claim 1, further comprising a plurality of leaf nodes at a periphery of the DAG, wherein at least one aggregation node of the DAG is configured to receive the input cue signals via one or more leaf nodes of the plurality of leaf nodes, and wherein each leaf node is configured to:

receive indication of occurrence of an event from a specific source module; and subsequently transmit an input cue signal, indicating occurrence of that event via a lean connection, to an aggregation node in the DAG.

3. The event aggregation fabric of claim 1, wherein the DAG further comprises one or more relay nodes, configured to:

receive a relay rule, defining a logic for relaying input cue signals between an input port and an output port of the relay node;

receive, via the input port, an output cue signal of a first aggregation node or leaf node as an input cue signal; and transfer the received input cue signal via the output port, as input to a second aggregation node or terminal node in the aggregation fabric, based on the relay rule.

4. The event aggregation fabric of claim 1, wherein at least one aggregation node is further configured to increment the deficit count when a number of input cue signals received in a predetermined timeframe exceeds the number of output cue signals generated in that timeframe.

5. The event aggregation fabric of claim 1, wherein at least one aggregation node is further configured to decrement the deficit count, and generate an output cue signal at a predetermined timeframe, when (i) the deficit count is non-zero and (ii) a number of input cue signals received in that timeframe is less than number of output cue signals generated in that timeframe.

6. The event aggregation fabric of claim 1, wherein at least one aggregation node is further configured to:

maintain a first deficit count of input cue signals, pertaining to a first type of events;

maintain at least one second deficit count of input cue signals, pertaining to at least one respective, second type of events; and generate the output cue signal, based on the first deficit count and the at least one second deficit count.

7. The event aggregation fabric of claim 6 wherein the first type of events is a termination of a first type of task in the source modules, and wherein the at least one second type of events is a termination of at least one respective, second type of task in the source modules.

8. The event aggregation fabric of claim 7, wherein a first terminal node of the DAG is adapted to transfer the output cue signal to a first target module of the one or more target modules, as a global acknowledgement signal, representing an overall indication of termination of the first type of task in the source modules.

9. The event aggregation fabric of claim 8, wherein at least one second terminal node of the DAG is adapted to transfer respective output cue signals to at least one second, respective target module of the one or more target modules, as a global acknowledgement signal, representing an aggregated indication of termination of the at least one second type of task in the source modules.

10. The event aggregation fabric of claim 1 wherein at least one aggregation node is further configured to:

receive a generation rule, defining a logic for generating an output cue signal;

receive one or more input cue signals via one or more input ports of the aggregation node; and generate the output cue signal on an output port of the aggregation node, based on the deficit count and the one or more input cue signals, in accordance with the generation rule.

11. The event aggregation fabric of claim 10, wherein said generation rule determines an output format of output cue signals, wherein said output format comprises a broadcast, or multicast of an output cue signal to the one or more target modules and/or subsequent aggregation nodes in the DAG, via multiples output ports of the aggregation node.

12. The event aggregation fabric of claim 10, wherein said generation rule determines an output format of output cue signals, wherein said output format is selected from a list consisting of: (i) transmission of output cue signals, pertaining to a first event type, and at least one second event type via separate, dedicated output ports of the aggregation node, and (ii) transmission of an encoded combination of output cue signals pertaining to the first event type and the at least one second event type, via a common output port of the aggregation node.

13. The event aggregation fabric of claim 10, wherein said logic is selected from a list consisting of: (i) a function of a deficit count pertaining to the first event type, (ii) a function of a deficit count pertaining to the at least one second event type, (iii) a weighted function of input cue signals from preceding aggregation nodes, (iv) a weighted function of input cue signals from leaf nodes, and (v) any combination thereof.

14. The event aggregation fabric of claim 10, wherein said logic comprises a prioritization between a first event type and at least one second event type.

15. The event aggregation fabric of claim 14, wherein said prioritization is calculated based on at least one of: (i) a deficit count of the first event type (ii) a deficit count of the at least one second event type, (iii) a metric of fairness between the first event type and the at least one second event type, (iv) time of arrival of input cue signals of the first event type, (v) time of arrival of input cue signals of the at least one second event type, or any combination thereof.

16. A reconfigurable Integrated Circuit (IC) comprising:
a plurality of Processing Elements (PEs);
reconfiguration management module, configured to:
identify tasks for execution within the IC;
allocate subsets of the plurality of PEs as source modules, adapted to perform the identified tasks;
allocate one or more PEs to form one or more target modules in the IC; and
based on said allocation, define a Directed A-cyclic Graph (DAG) according to the allocated source modules, wherein the DAG is configured to:
aggregate indications of event notification from said source modules;
generate a global notification signal, representing a count of notification events by the source modules of the IC; and
propagate the global notification signal to a specific target module of the at least one or more target modules,
wherein the specific target module is adapted to control a processing workflow in the IC based on the global notification signal.

17. The IC of claim 16, wherein the reconfiguration management module is configured to define the DAG by configuring a plurality of aggregation nodes, interconnected over arcs, implemented by lean connections, wherein each aggregation node in the DAG is defined as either a terminal node, representing a final aggregation point in the DAG, or as a non-terminal node, and wherein one or more aggregation nodes of the plurality of aggregation nodes is configured to:

receive input cue signals, originating from one or more source modules in the IC, wherein each input cue signal indicates completion of a task in said source modules;

maintain a deficit count of the input cue signals and generate an output cue signal, based on said deficit count, wherein the deficit count represents a number of input cue signals that have been received but have not yet been transferred as output cue signals;

when the aggregation node is a terminal node of the DAG, transfer the output cue signal as the global indication signal to a specific target module of the one or more target modules in the IC;

when the aggregation node is not a terminal node of the DAG, transfer the output cue signal via a lean connection to a subsequent aggregation node of the DAG, towards the terminal node.

18. A method of aggregating indications in an Integrated Circuit (IC), said method comprising:

allocating a plurality of aggregation nodes in the IC;

interconnecting the aggregation nodes by single-wire connections, to form a Directed A-cyclic Graph (DAG), wherein each aggregation node in the DAG is defined as either a terminal node, representing a final aggregation point in the DAG, or as a non-terminal node;

designating source modules and at least one target module in the IC; and configuring each aggregation node in the DAG to:

receive input cue signals, originating from one or more source modules in the IC via respective one or more single wire connections, wherein each input cue signals indicates occurrence of an event of a specific type in said source modules;

maintain a deficit count of the input cue signals, pertaining to the specific type of events, and generate an output cue signal, based on said deficit count, wherein the deficit count represents a number of input cue signals that have been received but have not yet been transferred as output cue signals;

when the aggregation node is a terminal node of the DAG,
transfer the output cue signal as a global indication
signal, representing an aggregation of occurrence of
events in said source modules, to a target module in the
IC; and when the aggregation node is not a terminal node of the
DAG, transfer the output cue signal via single-wire
connection to a subsequent aggregation node in the
DAG, towards the terminal node, wherein the target module is configured to control a
processing workflow on the IC based on said global
indication.

* * * * *